United States Patent
Brown et al.

(12) United States Patent (10) Patent No.: US 7,058,780 B2
(45) Date of Patent: Jun. 6, 2006

(54) DEVICE RESOURCE ALLOCATION

(75) Inventors: Mark L Brown, Gilbert, AZ (US);
Paul E Luse, Chandler, AZ (US);
Wolfgang E Michel, Bad Wimpfen
(DE); Ralph Gundacker,
Talheim/Neckar (DE)

(73) Assignee: Intel Corporation, Santa Clara, CA
(US)

( * ) Notice: Subject to any disclaimer, the term of this
patent is extended or adjusted under 35
U.S.C. 154(b) by 474 days.

(21) Appl. No.: 10/158,094

(22) Filed: May 29, 2002

(65) Prior Publication Data

US 2003/0225990 A1 Dec. 4, 2003

(51) Int. Cl.
*G06F 12/00* (2006.01)

(52) U.S. Cl. ........................................ 711/170; 710/140
(58) Field of Classification Search ................. 711/170, 711/173; 710/104
See application file for complete search history.

(56) References Cited

U.S. PATENT DOCUMENTS

| | | | |
|---|---|---|---|
| 5,832,238 A * | 11/1998 | Helms ........................ 710/105 |
| 6,260,094 B1 | 7/2001 | Davis et al. |
| 6,629,157 B1 * | 9/2003 | Falardeau et al. ............. 710/10 |
| 2003/0009432 A1 * | 1/2003 | Sugahara et al. .............. 707/1 |
| 2003/0093604 A1 * | 5/2003 | Lee ............................. 710/302 |
| 2003/0188062 A1 * | 10/2003 | Luse et al. .................. 710/104 |

OTHER PUBLICATIONS

Adaptec –Adaptec SCSI RAID 2000S Support.
Adaptec –Adaptec SCSI RAID 2005S Support.
Adaptec –Motherboard Partners and Compatibility.
Adaptec –Adaptec SCSI RAID 2005S Technical SPecs.
Adaptec –Adaptec Article: Zero Channel RAID Frequently Asked Questions.
Intel Corp., Product Brief, Intel Server Board SCB2.
Serial ATA: High Speed Serialized AT Attachment Revison 1.0, Aug. 29, 2001.
Super0, Super P3TDDR, User's Manual, Revision 1.0a.
PCI Local Bus, PCI BIOS Specification, Revision 2.1 Aug. 26, 1994.
PCI Local Bus, PCT–to–PCI Bridge Architecture Specification, Revison 1.1, Dec. 16, 1998.
PCI Local Bus, PCI Local Bus Specification, Revision 2.2, Dec. 18, 1998.
PCI Local Bus, Mini PCI Specification, Revision 1.0, Oct. 25, 1999.
PCI Local Bus, PCI–X Addendum to the PCI Local Bus Specification, Revision 1.0a, Jul. 24, 2000.
PCI Local Bus, PCI Local Bus Specification, Revision 2.3, Mar. 29, 2002.
PCI Local Bus, Appendix D, Class Codes.
PCI Local Bus, Appendix H, Capability IDs, 0003.13.
R. Russell, BIOS Basics Online!, Jun. 5, 2001, one page.
A. Tischenkó, "Zero–Channel RAID. The Economic Approach", Computer Review Online!, four pages.
Intel Corporation, "DK440LX Motherboard –Technical Product Specification", Oct. 1997, pp. 1–90.
Intel Corporation, "MROMB Design Considerations Using the Intel 80303 I/O Processor –Application Note" Sep. 2001, 15 pages.
Copy of PCT Search Report dated Apr. 19, 2004.

* cited by examiner

*Primary Examiner*—Hiep T. Nguyen
(74) *Attorney, Agent, or Firm*—Christopher K. Gagne (57) ABSTRACT

In one embodiment, a method is provided. The method of this embodiment may include detecting an operation initiated by a first device that can result in a change of a first set of resources previously allocated to a second device. If the operation has completed at least a certain phase of the operation and the first set of resources has changed as a result of the operation, the method of this embodiment may also comprise changing, by the second device, a second set of resources previously allocated by the second device to a third device. Of course, many modifications, variations, and alternatives are possible without departing from this embodiment.

30 Claims, 5 Drawing Sheets

DEVICE RESOURCE ALLOCATION

CROSS-REFERENCE TO RELATED APPLICATION

The subject matter disclosed in the subject application is related to the subject matter disclosed in co-pending U.S. patent application Ser. No. 10/113,458, filed Mar. 28, 2002, entitled "Device Resource Allocation."

FIELD

This disclosure relates to the field of device resource allocation.

BACKGROUND

In modular redundant array of independent or inexpensive disk (RAID) on motherboard (MROMB) techniques, MROMB circuitry residing on a circuit card, for example, may be used to configure and control, independently of a host processor residing on the motherboard, an input/output (I/O) controller that also may reside on the motherboard. MROMB hardware on the motherboard performs operations that enable the MROMB circuitry on the circuit card to configure and control the I/O controller independently of the host processor.

When configuring the I/O controller, the circuit card may allocate, independently of the host processor, predetermined addresses to the I/O controller. As a result, depending upon the addresses that may be allocated to other devices by the host processor, such as, for example, during a host processor-initiated configuration cycle, it may be possible for one or more of the I/O controller's addresses to conflict with one or more of the addresses allocated to other devices by the host processor.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
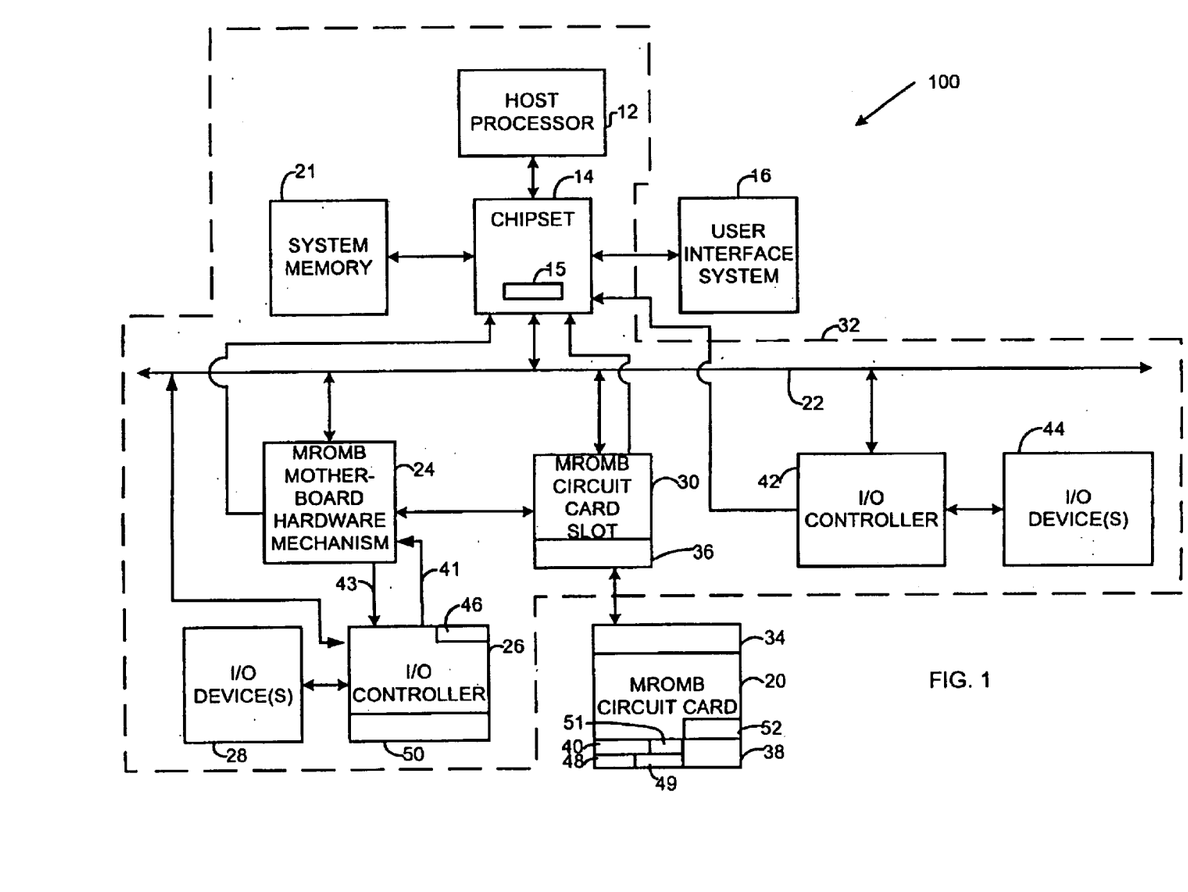
FIG. 1 is diagram that illustrates an embodiment of the claimed subject matter.

FIG. 1 illustrates a system embodiment 100 of the claimed subject matter. System 100 may include a host processor 12 coupled to a chipset 14. Host processor 12 may comprise, for example, an Intel® Pentium® III or IV microprocessor that is commercially available from the assignee of the subject application. Of course, alternatively, host processor 12 may comprise another type of microprocessor, such as, for example, a microprocessor that is manufactured and/or commercially available from a source other than the assignee of the subject application, without departing from this embodiment.

Chipset 14 may comprise a host bridge/hub system that may couple host processor 12, a system memory 21 and a user interface system 16 to each other and to a bus system 22. Chipset 14 may also include an I/O bridge/hub system (not shown) that may couple the host bridge/bus system to bus 22. Chipset 14 may comprise integrated circuit chips, such as those selected from integrated circuit chipsets commercially available from the assignee of the subject application (e.g., graphics memory and I/O controller hub chipsets), although other integrated circuit chips may also, or alternatively be used, without departing from this embodiment. Additionally, chipset 14 may include an interrupt controller 15 that may process interrupts that it may receive from other components in system 100, such as, e.g., MROMB circuit card 20, when card 20 is inserted into circuit card bus extension slot 30, I/O controller 26, and/or I/O controller 42. Of course, alternatively, the operative MROMB circuitry described herein as being comprised in card 20, need not be comprised in card 20, but instead, without departing from this embodiment, may be comprised in other structures, systems, and/or devices that may be coupled to bus 22, and exchange data and/or commands with other components in system 100. User interface system 16 may comprise, e.g., a keyboard, pointing device, and display system that may permit a human user to input commands to, and monitor the operation of, system 100.

Bus 22 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Alternatively, bus 22 may comprise other types and configurations of bus systems, without departing from this embodiment.

An I/O controller 26 may be coupled, via MROMB motherboard hardware mechanism 24, to chipset 14, PCI bus 22, and MROMB circuit card slot 30. I/O controller 26 may also be coupled to and control the operation of one or more I/O devices (hereinafter collectively or singly referred to as "I/O device 28"). I/O device 28 may comprise, for example, a set of one or more storage devices comprising, e.g., one or more magnetic disks, optical disks, or solid-state storage devices. The one or more storage devices may be configured as e.g., one or more arrays of mass storage devices.

Alternatively, I/O device 28, instead, may comprise one or more network adapter or interface devices that may be used to interface system 100 to one or more external computer networks. According to this alternative arrangement, I/O device 28 may exchange data and/or commands with external network devices (e.g., host or server computer nodes) via the one or more external computer networks.

System 100 also may include another I/O controller 42. I/O controller 42 may be coupled to bus 22. I/O controller 42 may also be coupled to and control the operation of one or more I/O devices (hereinafter collectively or singly referred to as "I/O device 44"). I/O device 44 may comprise, for example, a set of one or more storage devices comprising, e.g., one or more magnetic disks, optical disks, or solid-state storage devices. These one or more storage devices may be configured as e.g., one or more arrays of mass storage devices.

Alternatively, I/O device 44, instead, may comprise one or more network adapter or interface devices that may be used to interface system 100 to one or more external computer networks. According to this alternative arrangement, I/O device 44 may exchange data and/or commands with external network devices (e.g., host or server computer nodes) via the one or more external computer networks.

Processor 12, system memory 21, chipset 14, PCI bus 22, MROMB hardware mechanism 24, MROMB circuit card slot 30, I/O controller 26, and I/O controller 42 may be comprised in a single circuit board, such as, for example, a system motherboard 32. Although I/O device 28 and I/O device 44 are shown in FIG. 1 as being comprised in the motherboard 32, I/O device 28 and/or I/O device 44 need not be comprised in the motherboard 32. For example, I/O device 28 and I/O device 44 each may be comprised in one or more respective enclosures that are separate from the enclosure in which the motherboard 32 and the components comprised in the motherboard 32 are enclosed.

Depending upon the particular configuration and operational characteristics of I/O device 28, I/O controller 26 may exchange data and/or commands with I/O device 28 using any one of a variety of different communication protocols, e.g., a Small Computer Systems Interface (SCSI), Fibre Channel (FC), Ethernet, Serial Advanced Technology Attachment (S-ATA), or Transmission Control Protocol/Internet Protocol (TCP/IP) communication protocol. Of course, alternatively, I/O controller 26 may exchange data and/or commands with I/O device 28 using other communication protocols, without departing from this embodiment of the claimed subject matter.

In accordance with this embodiment, a SCSI protocol that may be used by controller 26 to exchange data and/or commands with I/O device 28 may comply or be compatible with the interface/protocol described in American National Standards Institute (ANSI) Small Computer Systems Interface-2 (SCSI-2) ANSI X3.131-1994 Specification. If a FC protocol is used by controller 26 to exchange data and/or commands with I/O device 28, it may comply or be compatible with the interface/protocol described in ANSI Standard Fibre Channel (FC) Physical and Signaling Interface-3 X3.303:1998 Specification. Alternatively, if an Ethernet protocol is used by controller 26 to exchange data and/or commands with I/O device 28, it may comply or be compatible with the protocol described in Institute of Electrical and Electronics Engineers, Inc. (IEEE) Std. 802.3, 2000 Edition, published on Oct. 20, 2000. Further, alternatively, if a S-ATA protocol is used by controller 26 to exchange data and/or commands with I/O device 28, it may comply or be compatible with the protocol described in "Serial ATA: High Speed Serialized AT Attachment," Revision 1.0, published on Aug. 29, 2001 by the Serial ATA Working Group. Also, alternatively, if TCP/IP is used by controller 26 to exchange data and/or commands with I/O device 28, it may comply or be compatible with the protocols described in Internet Engineering Task Force (IETF) Request For Comments (RFC) 791 and 793, published September 1981. Also in accordance with this embodiment, if I/O device 28 is used to interface system 100 to one or more external computer networks, I/O device 28 may exchange data and/or commands with external host and/or server computer nodes via the one or more external computer networks using, e.g., the aforesaid TCP/IP and/or Ethernet protocols.

Similarly, depending upon the particular configuration and operational characteristics of I/O device 44, I/O controller 42 may exchange data and/or commands with I/O device 44 using one of the different types of communication protocols that may be used by I/O controller 26 (depending upon the particular configuration and operational characteristics of I/O device 28) to exchange data and/or commands with I/O device 28. Alternatively, I/O controller 42 may exchange data and/or commands with I/O device 44 using other communication protocols, without departing from this embodiment of the claimed subject matter.

Circuit card slot 30 may comprise a PCI expansion slot that comprises a PCI bus connector 36. Connector 36 may be electrically and mechanically mated with a PCI bus connector 34 that is comprised in MROMB circuit card 20. In addition to comprising connector 34, circuit card 20 also may comprise an I/O processor 40 and computer-readable memory 38. Depending upon the particular embodiment, memory 38 may comprise one or more of the following types of computer-readable memories: semiconductor firmware memory, programmable memory, non-volatile memory, read only memory, electrically programmable memory, random access memory, cache memory, flash memory, magnetic disk memory, and/or optical disk memory. Additionally, it should be appreciated that, either additionally or alternatively, memory 38 may comprise other and/or later-developed types of computer-readable memory.

Slot 30 and card 20 are constructed to permit card 20 to be inserted into slot 30. When card 20 is properly inserted into slot 30, connectors 34 and 36 become electrically and mechanically coupled to each other. When connectors 34 and 36 are so coupled to each other, card 20 becomes electrically coupled, via motherboard MROMB hardware mechanism 24, to controller 26 and to interrupt controller 15, and card 20 also becomes electrically coupled to bus 22.

In this embodiment, MROMB hardware mechanism 24 in motherboard 32 permits a MROMB technique to be implemented in system 100. For example, hardware mechanism 24 may comprise MROMB circuitry of the type used in the Intel® SCB2 Server Board (commercially available from the Assignee of the subject application), which MROMB circuitry may permit a RAID input/output steering (RAIDIOS) technique to be implemented in system 100. Alternatively, hardware mechanism 24 may comprise different circuitry, such as, for example, embedded RAID logic (EMRL) MROMB circuitry of the type used in, e.g., the P3TDDR™ motherboard (commercially available from SUPERMICRO Computer Corporation of San Jose, Calif., United States of America), which MROMB circuitry may permit an EMRL technique to be implemented in system 100.

Figure 2:
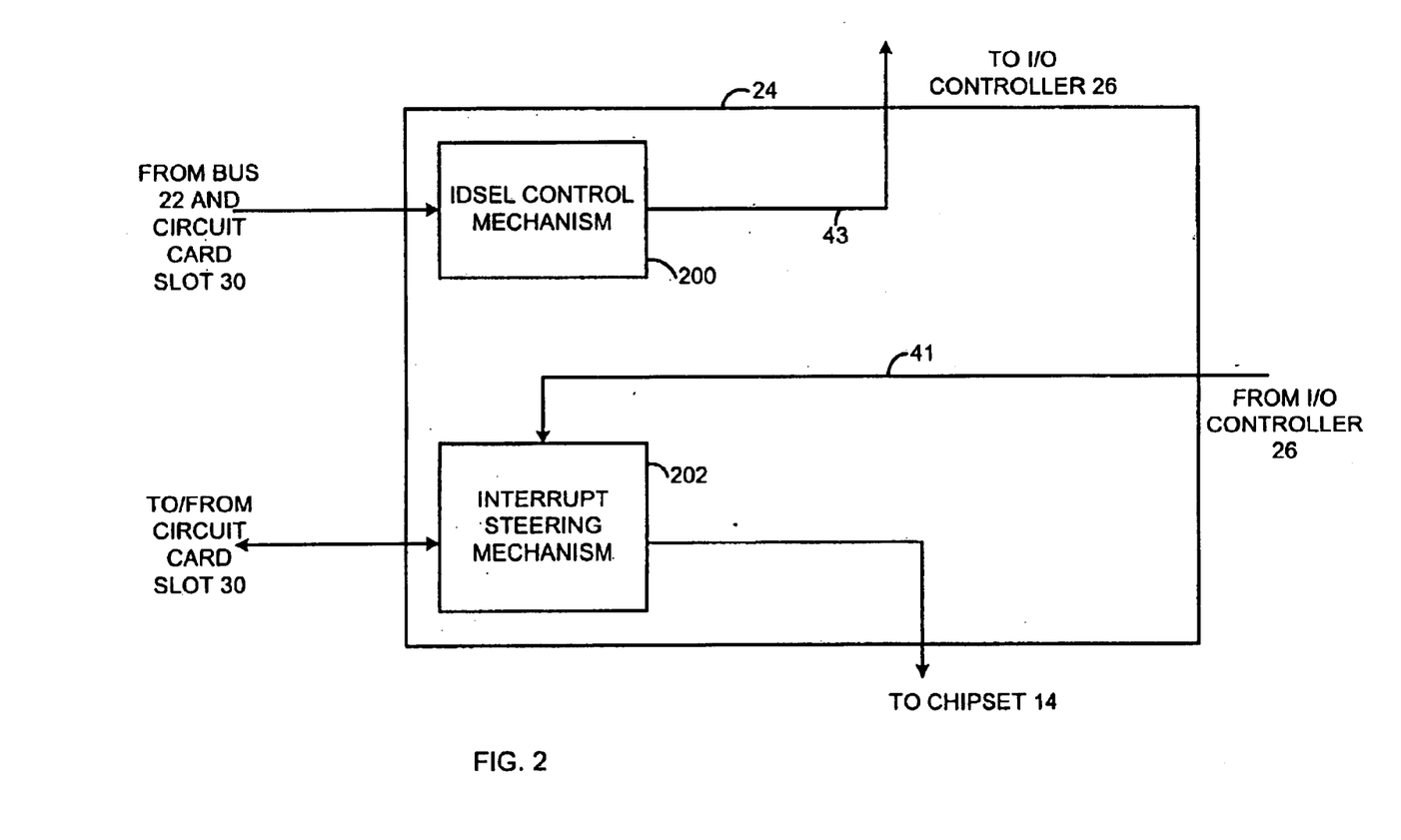
FIG. 2 is a diagram that illustrates MROMB motherboard hardware in greater detail.

With particular reference now being made to FIG. 2, the particular configuration and operation of hardware mechanism 24 may vary depending upon whether hardware mechanism 24 implements a RAIDIOS or non-RAIDIOS type of MROMB technique. However, in this embodiment, the MROMB hardware 24 may comprise an Initialization Device Select (IDSEL) control mechanism 200 and an interrupt steering mechanism 202. IDSEL control mechanism 200 may be coupled to PCI bus 22, circuit card slot 30, and I/O controller 26. IDSEL control mechanism 200 may include circuitry that may controllably couple an IDSEL signal line 43 of I/O controller 26 to, or de-couple line 43 from PCI bus 22, based at least in part upon a control signal provided from slot 30 to mechanism 200.

As is well known to those skilled in the art, IDSEL signal line 43 of I/O controller 26 may be coupled to a predetermined one of the address lines of bus 22, and the IDSEL signal that may be supplied to controller 26 via line 43 may be used during configuration cycles (such as, for example, following a reset of system 100) as a select or enable signal to enable configuration and/or control of I/O controller 26 during such configuration cycles. In accordance with this embodiment, when card 20 is absent from slot 30, a control signal is supplied to mechanism 200 from slot 30 that results in mechanism 200 coupling IDSEL signal line 43 to bus 22 in order to allow host processor 12 to drive line 43 during host processor-initiated configuration cycles. However, when card 20 is properly inserted into slot 30, slot 30 supplies a control signal to mechanism 200 that results in mechanism 200 de-coupling IDSEL line 43 from bus 22 to "hide" controller 26 from host processor 12 during such cycles. Thereafter, by appropriately controlling this control signal, card 20 may selectively couple IDSEL line 43 to, and/or selectively de-couple line 43 from bus 22, e.g., during multiple scans of bus 22 initiated by I/O processor 40, in order to permit controller 26 to be located, configured, and/or controlled by card 20, instead of by host processor 12. With the exception of the one predetermined address line of bus 22 that may be used to propagate the IDSEL signal to I/O controller 26 via line 43, in this embodiment, signal lines of PCI bus 22 may be directly coupled to the I/O controller 26 in such a way as to permit I/O controller 26 to exchange data and/or commands, via bus 22, with other devices in system 100 that may also be coupled to bus 22.

Interrupt steering mechanism 202 may be coupled to circuit card slot 30, I/O controller 26, and interrupt controller 15 in chipset 14. Mechanism 202 may couple one or more interrupt signal lines (collectively or singly referred to by numeral 41 in FIG. 1) from I/O controller 26 to card slot 30. Mechanism 202 also may selectively couple interrupt signal lines 41 to interrupt controller 15 in chipset 14 based upon a control signal supplied to mechanism 202 from slot 30. The supply of this control signal to mechanism 202 may result in interrupt signal lines 41 of I/O controller 26 being coupled to interrupt controller 15 when card 20 is absent from slot 30, and may result in interrupt signal lines 41 being de-coupled from interrupt controller 15 when card 20 is properly inserted in slot 30. Thus, when card 20 is absent from slot 30, interrupt signals generated by I/O controller 26 may be routed or steered by mechanism 202 to interrupt controller 15 for processing by interrupt controller 15. However, when card 20 is present in slot 30, interrupt signals generated by I/O controller 26 may be routed by mechanism 202 to card 20 for processing by processor 40 in card 20. Slot 30 may transmit interrupt signals generated by card 20, when card 20 is properly inserted into slot 30, to interrupt controller 15 to permit these interrupts to be handled by interrupt controller 15.

If hardware mechanism 24 implements RAIDIOS, IDSEL control mechanism 200 may include a transistor-based switching mechanism (not shown) that may be either in a first state, in which IDSEL signal line 43 of I/O controller 26 may be coupled to PCI bus 22, or in a second state, in which line 43 may be de-coupled from PCI bus 22. In one embodiment, the control signal that controls the state of this switching mechanism may be the Joint Test Action Group (JTAG) IEEE Standard Test Access Port and Boundary-Scan Architecture Test Mode Select (TMS) signal from PCI bus slot 30. This TMS signal may be compliant with IEEE Standard 1149.1-1990. That is, the TMS signal pin in PCI slot 30 may be coupled to control mechanism 200, and the signal (hereinafter termed the "TMS signal" of slot 30) propagating to control mechanism 200 through this TMS signal pin of slot 30 may control the switching mechanism in control mechanism 200. Slot 30 may be constructed such that, when card 20 is absent from slot 30, the TMS signal may be asserted. This may result in control mechanism 200 connecting IDSEL signal line 43 to bus 22. However, when card 20 is properly inserted into slot 30, the TMS signal initially may be de-asserted. This may resulting in control mechanism 200 de-coupling line 43 from bus 22. Thereafter, processor 40 in card 20 may control whether the TMS signal is asserted or de-asserted, in the manner that will be described below.

Additionally, if hardware 24 implements RAIDIOS, interrupt steering mechanism 202 may include a plurality of tri-state buffers (not shown) controlled by the logic state of the signal (hereinafter termed the "TDI signal" from slot 30) propagating through the JTAG Test Data Input (TDI) pin of slot 30. These tri-state buffers may permit predetermined interrupt signals propagated from controller 26 via lines 41 to be received by interrupt controller 15 when the signal propagating through the TDI pin of slot 30 is of a predetermined logic level (e.g., a high logic state). Slot 30 may be constructed such that, when card 20 is absent from slot 30, the signal propagating through the TDI pin of slot 30 may be driven to a high logic state, and conversely, when card 20 is properly inserted in slot 30, this signal may be driven to a low logic state and the interrupt signals from I/O controller 26 may be routed to predetermined interrupt signal pins of slot 30. An interrupt signal pin of slot 30 may be coupled to interrupt controller 15.

Figure 3:
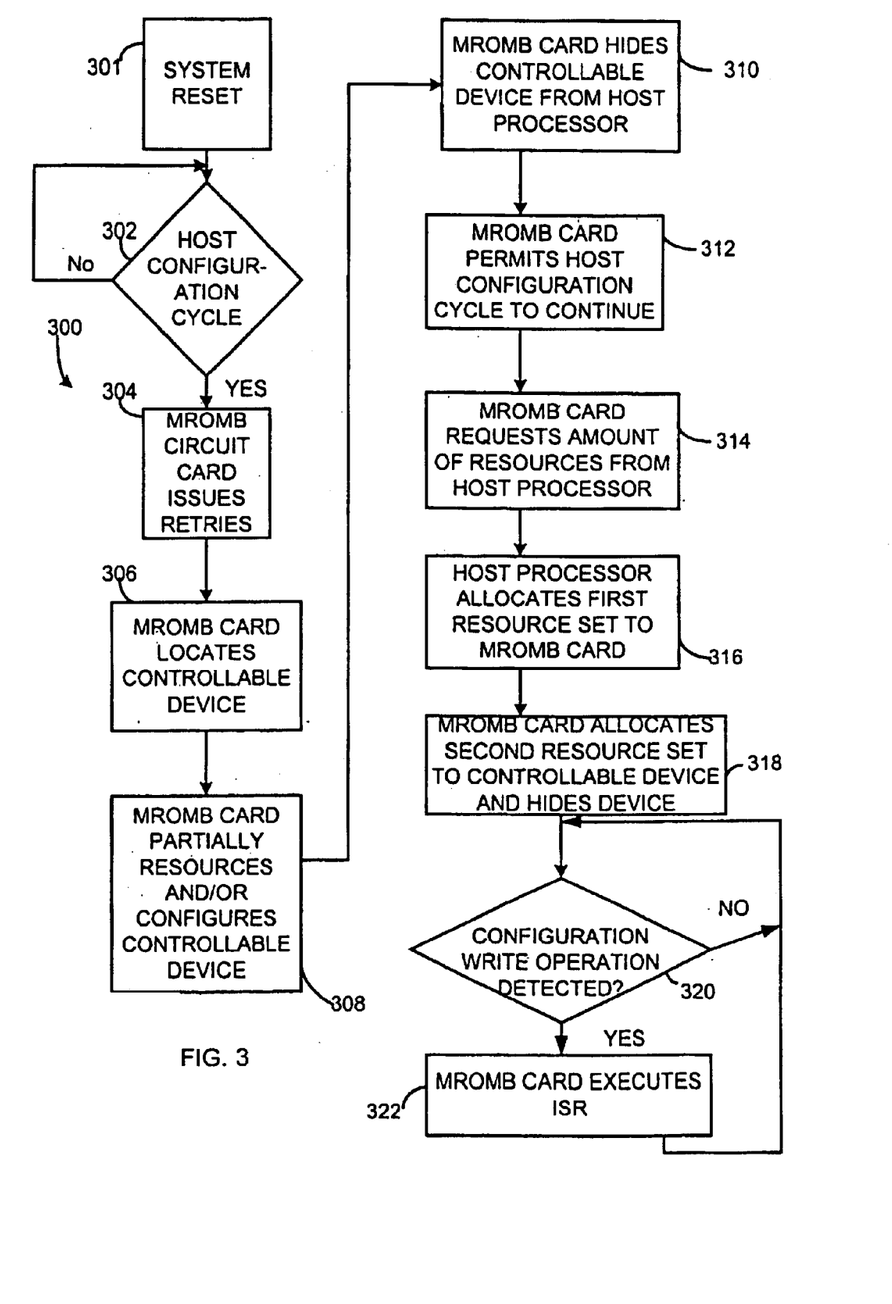
FIG. 3 is a flowchart that illustrates operations that may be performed in one embodiment.

Card 20 may include firmware program instructions stored in memory 38 that, when executed by processor 40, may result in card 20 issuing appropriate control signals to hardware 24 that may permit processor 40 to locate, control, and/or configure I/O controller 26. FIG. 3 is a flowchart that illustrates these and other operations 300 that may be carried out in system 100, in accordance with one embodiment.

After, for example, a reset of system 100, such as operation 301 in FIG. 3, I/O processor 40 in card 20 may execute one or more subroutines or procedures comprised in the firmware program instructions stored in memory 38. This may result in processor 40 snooping bus 22 to determine whether PCI configuration cycles have been initiated by host processor 12 for devices (hereinafter termed "bus addressable devices," e.g., I/O controller 26, I/O controller 42, and card 20) that are coupled to, and are addressable and/or configurable via bus 22 in such configuration cycles, such as operation 302 in FIG. 3.

After I/O processor 40 has determined that host processor 12 has initiated such configuration cycles, I/O processor 40 may signal card 20. This may result in card 20 issuing retries to host processor 12 to hold-off these configuration cycles initiated by the host processor 12, as illustrated by operation 304 in FIG. 3. Thereafter, while host processor-initiated configuration cycles are being held-off, I/O processor 40 may determine any bus addressable device in system 100 that may be controlled and/or configured by card 20 during one or more configuration cycles initiated by I/O processor 40, using hardware mechanism 24.

As used herein, a first device (such as, for example, I/O controller 26) may be considered to be "configurable" by a second device (such as, for example, I/O processor 40), if the second device is capable, at least in part, of controlling and/or selecting at least one feature, mode, and/or characteristic of operation of the first device. I/O processor 40 may also determine the location at which any such bus addressable device may be located, such as, for example, an address along bus 22 via which any such bus addressable device may be configured and/or controlled during one or more configuration cycles initiated by I/O processor 40, using hardware mechanism 24, as illustrated by operation 306 in FIG. 3. For example, this bus address may be predetermined, and processor 40 may be programmed with information that may specify and/or indicate this bus address. Based, at least in part, upon this information, I/O processor 40 may determine the location of any such bus addressable device in system 100 that may be controlled and/or configured by card 20 during one or more configuration cycles initiated by I/O processor 40, using hardware mechanism 24.

Alternatively, processor 40 may determine the location of any such controllable and/or configurable device in system 100 based, at least in part, upon results of multiple bus scans, for example, in accordance with the teachings of Luse et al., U.S. patent application Ser. No. 10/112,789, filed Mar. 28, 2002, entitled "DEVICE DISCOVERY AND DYNAMIC CONFIGURATION OF CONTROL APPLICATION," which Application is co-pending with and is assigned to the Assignee of the subject application. As used herein, a "bus scan" involves the issuance of one or more requests (such as, for example, PCI configuration read requests) to one or more addresses of a bus (such as, for example, bus 22) to obtain one or more responses (such as, for example, PCI configuration read responses) that may be, and/or contain information indicative of the existence, characteristics, type, and/or operation of one or more bus addressable devices.

For example, in system 100, I/O controller 26 may be a bus addressable device that may be controllable and/or configurable by processor 40 using hardware 24. Accordingly, as a result of operation 306, processor 40 may determine that I/O controller 26 is such a bus addressable device, and processor 40 may also determine the address along bus 22 via which I/O controller 26 may be controlled and/or configured during one or more PCI configuration cycles initiated by I/O processor 40, using hardware mechanism 24.

After processor 40 has completed operation 306, processor 40 may partially resource and/or configure any bus addressable device that processor 40 determines to be controllable and/or configurable by processor 40 using hardware 24, based upon configuration information obtained by processor 40 from any such bus addressable device, as illustrated in operation 308 in FIG. 3. That is, processor 40 may allocate resources to and/or configure any such bus addressable device, with the exception that, in operation 308, processor 40 may not make an allocation of memory mapped I/O address resources. As used herein, a "resource" of a system may include a facility, instrumentality, and/or identifier for such facility and/or instrumentality in the system, that may be allocated (e.g., granted) from a pool of facilities, instrumentalities, and/or identifiers, for use by and/or association with one or more devices in the system, such as, for example, in system 100, one or more memory mapped I/O addresses. As is known to those skilled in the art, in a memory mapped I/O addressing scheme, subsets of a system's total address space may be assigned to I/O ports and/or memory locations associated with and/or used by such ports, and these ports and/or memory locations may be accessed by using and/or specifying addresses comprised in the subsets. As used herein, the term "address space" is defined to be a set of memory locations that may be separately addressed, such as, for example, via signals propagating through address lines of a bus. Also as used herein, the phrases "amount of an address space" and "size of an address space" are defined to be the number of memory locations comprised in an address space.

In this embodiment, in operation 308, processor 40 may obtain configuration information from I/O controller 26 that may identify the particular device type and characteristics of I/O controller 26. The configuration information obtained by processor 40 from I/O controller 26 also may indicate a size of memory mapped I/O address space that when allocated to I/O ports and/or memory locations (illustrated collectively in FIG. 1 by the structure referenced by numeral 46) in controller 26 may permit processor 40 to control and/or monitor operation of the controller 26. Based upon this information, processor 40 then may signal card 20 to supply and store in controller 26 and memory 21 control and/or configuration-related information to permit controller 26 to operate in accordance with enhanced I/O procedures. As a result of the signaling of card 20 by processor 40, card 20 may apply, via bus 22, signals to memory 21 and/or controller 26. The application of such signals may result in the storing of such control and/or configuration-related information in locations in memory 21 that may be pre-selected so as not to conflict with locations in memory 21 that might be selected by host processor 12, such as, during configuration write operations initiated by the host processor 12, for storage of control and configuration-related information for devices configured by host processor 12. If I/O device 28 comprises an array of disk mass storage devices, these I/O procedures may permit I/O controller 26 and the array to be used as a RAID storage controller and/or RAID array, respectively. Alternatively, if I/O device 28 is used to interface system 100 to an external computer network, the I/O procedures may permit I/O controller 26 to be used as a server management controller, and/or may permit controller 26 and device 28 to utilize additional communication protocols.

After processor 40 has carried out operation 308, processor 40 may signal card 20 to apply to hardware 24 a control signal that may result in hardware 24 hiding from host processor 12 any bus addressable device that is controllable and/or configurable by processor 40 using hardware 24, as is illustrated by operation 310 in FIG. 3. For example, in this embodiment 100, processor 40 may signal card 20 to apply to hardware 24 a control signal that may result in hardware 24 de-coupling IDSEL line 43 from bus 22. Thereafter, processor 40 may signal card 20 to stop generating retries to hold-up the host processor's configuration cycles, and may permit the host processor's boot process to continue unhindered, as illustrated by operation 312 in FIG. 3.

During one of the host processor's configuration cycles, processor 40 may signal card 20 to request from host processor 12 an amount of resources of system 100 to be allocated to card 20, and an amount of resources to be allocated to I/O controller 26. This may result in card 20 issuing to host processor 12, via bus 22, one or more requests that that host processor 12 allocate such resources to card 20 and controller 26, as illustrated by operation 314 in FIG. 3. These one or more requests may be and/or result from, e.g., one or more PCI configuration read operations executed by host processor 12 to I/O processor 40, using bus 22.

Figure 4:
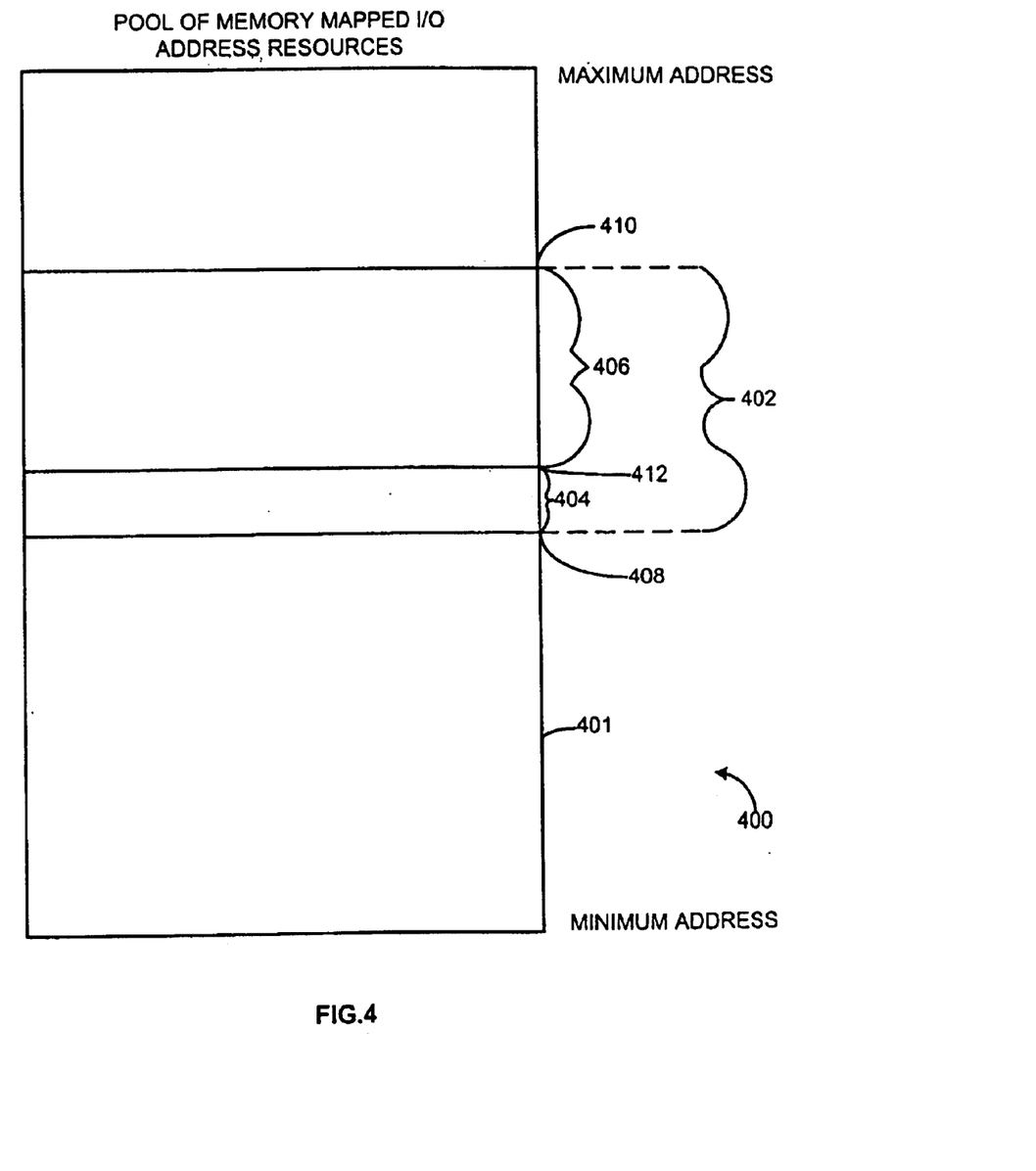
FIG. 4 is a diagram that illustrates an address allocation in one embodiment.

As illustrated in FIG. 4, system 100 comprises a total amount or available pool memory mapped I/O address resources 400. Resources 400 comprise a plurality of memory mapped I/O addresses 401 that may extend contiguously from a predetermined minimum address to a predetermined maximum address. The resources that host processor 12 may allocate to card 20 and controller 26, in response to the one or more requests issued to processor 12 from card 20, may include a first set of resources, as illustrated by operation 316 in FIG. 3. This first set of resources may include a second set of resources to be allocated by card 20 to controller 26. For example, in this embodiment, this first set of resources may include a memory mapped I/O address space 402. The address space 402 may comprise an address space 404 to be allocated to card 20 and an address space 406 to be allocated by card 20 to controller 26. As part of operation 316, host processor 12 may perform one or more PCI configuration write operations, via bus 22, that may write one or more values into one or more memory locations 48 in processor 40. Locations may comprise one or more base address registers. The values that may be written into locations 48 may specify and/or indicate the first set of resources. By writing the values into locations 48, host processor 12 may indicate to processor 40 that the first set of resources has been allocated to card 20 by host processor 12.

Address space 402 may comprise a plurality of addresses that may extend from a lowest address 408 to a highest address 410 in space 402. The amount of address space 402 requested by card 20 may be equal to the sum of the sizes of two address spaces 404 and 406. Address space 404 may extend from the lowest address 408 in space 402 to a higher address 412 in space 402. Address space 406 may extend from a next highest address after address 412 in space 402 to the highest address 410 in space 402. Processor 40 may determine the amount of address space 406, based, at least in part, upon the configuration information obtained by processor 40 from the bus addressable device, for example, in operation 308 in FIG. 3, that processor 40 determined, for example, in operation 306 in FIG. 3, to be controllable and/or configurable by processor 40 using hardware 24. More specifically, respective configuration information obtained by processor 40 from this bus addressable device, for example, in operation 308 in FIG. 3, may indicate a size of memory mapped I/O address space that when allocated to one or more I/O ports and/or memory locations of the device may permit processor 40 to control and/or monitor operation of the device. The amount of address space 406, as determined by processor 40, may be equal to the size of this memory mapped I/O address space. For example, in system 100, the amount of address space 406, as determined by processor 40, may be equal to the amount of memory mapped I/O address space that may be indicated in the configuration information obtained by processor 40 from controller 26 in operation 308.

Processor 40 may be programmed with the amount of address space 404. The amount of address space 404 may be equal to an amount of memory mapped I/O address space that when allocated to one or more I/O ports and/or memory locations (illustrated collectively in FIG. 1 by the structure referenced by numeral 52) in card 20 may permit one or more other devices in system 100, such as, for example, host processor 12 and/or controller 26, to exchange data and/or commands with card 20.

In accordance with this embodiment, after host processor 12 allocates the first set of resources to card 20, I/O processor 40 allocates a second set of resources to controller 26. This second set of resources may comprise a subset of the first set of resources allocated to card 20 by host processor 12. For example, as stated previously, the first set of resources allocated to card 20 may include address space 402. I/O processor 40 may allocate the addresses comprised in space 404 to I/O ports and/or memory locations 52 in card 20. Thereafter, processor 40 may signal card 20 to assert the TMS signal. This may result in hardware 24 coupling IDSEL line 43 to bus 22. Thereafter, processor 40 may again signal card 20. This may result in card 20 executing a PCI configuration write operation, using bus 22, that may result in space 406 being allocated to one or more I/O ports and/or memory locations 46 in controller 26, and thereafter, card 20 may de-assert the TMS signal, to thereby hide controller 26 from host processor 12, as illustrated by operation 318 in FIG. 3.

More specifically, processor 40 may comprise one or more memory locations 49. Locations 49 may comprise one or more base address registers. Processor 40 may store in locations 49 once or more values that may specify and/or indicate mappings of the addresses in space 406 to the one or more I/O ports and/or memory locations 46. As part of operation 318, processor 40 may signal card 20 to perform one or more PCI configuration write operations, via bus 22, that may write one or more values into one or more memory locations 50 in controller 26. The one or more memory locations 50 may comprise one or more base address registers. The one or more values that may be written into locations 50 may specify and/or indicate the second set of resources allocated to controller 26. By writing the one or more values into locations 50, processor 40 may indicate to controller 26 that the second set of resources has been allocated to controller 26 by processor 40. In order to prevent contention with controller 26, processor 40 may not claim (e.g., during cycles of bus 22) any of the resources comprised in the second set of resources, as specified by the one or more values stored in memory locations 49.

Although address spaces 404 and 406 have been previously described as being mutually contiguous, address spaces 404 and 406 may alternatively be separated from each other by another address space (not shown) that may be allocated to another device in system 100, such as, for example, controller 42. Additionally, although address space 406 has been shown as comprising a single set of addresses, address space 406 may alternatively comprise a plurality of sets of addresses. These sets of addresses that may be comprised in address space 406 may be allocated to respective I/O channels of the controller 26. Further alternatively, if multiple bus addressable devices are comprised in system 100 may be controllable and/or configurable by card 20 using hardware 24, each such bus addressable device may be allocated one or more of these sets of addresses that may be comprised in address space 406.

Thereafter, host processor 12 may execute one or more program processes (e.g., one or more operating system processes) that may result in host processor 12 changing the first set of resources previously allocated. If this occurs, host processor 12 may initiate an additional PCI configuration write operation. This may result in changing of the one or more values stored in memory locations 48 to indicate to processor 40 that host processor 12 has changed the first set of resources.

Processor 40 may detect this PCI configuration write operation. When processor 40 detects this PCI configuration write operation, processor 40 may generate an interrupt signal that may result in processor 40 executing an interrupt service routine (ISR), as illustrated by operation 322 in FIG. 3. Memory 38 may store program instructions that, when executed by processor 40, may result in processor 40 executing this ISR.

Figure 5:
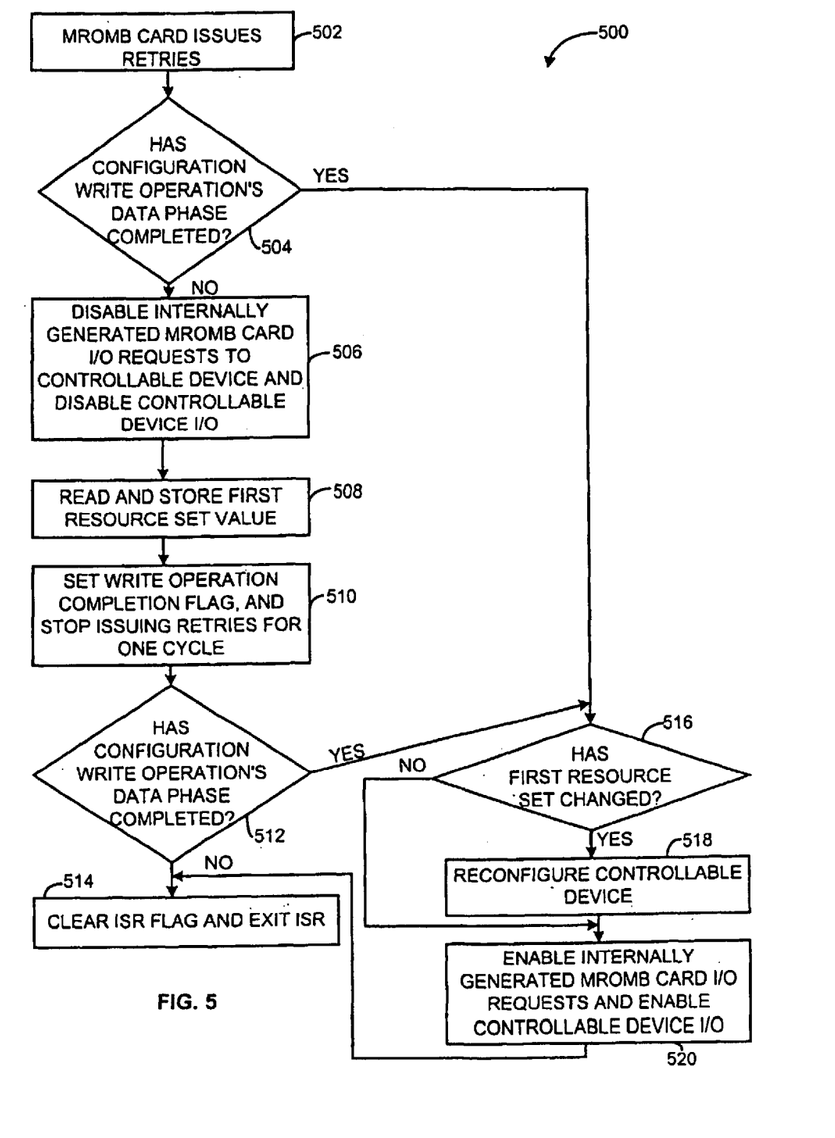
FIG. 5 is a flowchart that illustrates operations that may be performed in one embodiment.

FIG. 5 illustrates operations 500 that may be carried out as a result of execution of this ISR by processor 40. When processor 40 begins the execution of this ISR, processor 40 may signal card 20 to issue retries to host processor 12 in response to the PCI configuration write operation initiated by host processor 12. This may result in card 20 continuously issuing retries to host processor 12 in response to the PCI configuration write operation initiated by host processor 12, as illustrated by operation 502 in FIG. 5. Alternatively, in response to the PCI configuration write operation, processor 40 may signal card 20, prior to commencing execution of the ISR, to issue such retries to host processor 12. In either case, while card 20 is issuing such retries to host processor 12, the PCI configuration write operation initiated by host processor 12 to write one or more values into memory locations 48 may be held-off or prevented from proceeding.

Also while card 20 is issuing such retries to host processor 12, processor 40 may determine whether the data phase of the PCI configuration write operation initiated by host processor 12 has been completed, as illustrated by operation 504 in FIG. 5. Processor 40 may make this determination based, at least in part, upon whether a status bit value has been set in one or more memory locations (collectively and/or singly referred to by the structure referenced by numeral 51 in FIG. 1) in processor 40. That is, processor 40 may store one or more control and/or status words in memory locations 51 that may comprise one or more status and/or control bit values that may be set and/or cleared to control and/or indicate status of operations and/or operational parameters of processor 40. As used herein, a bit value is considered to be set when it is equal to a value that indicates a first Boolean logical value (e.g., True), and a bit value is considered to be cleared when it is equal to a value that indicates a second Boolean logical value (e.g., False) that is opposite to the first Boolean logical value.

As is known to those skilled in the art, a PCI configuration write operation commences with an address phase. The address phase is followed by a data phase whose completion terminates the operation. Among the status and/or control bit values in memory locations 51 may be a status bit value that, when set by processor 40, may indicate that the data phase of the host processor-initiated PCI configuration write operation that resulted in the commencement of execution of the ISR by processor 40 has been completed. In operation 504, processor 40 may examine this status bit value to determine whether it is set. If it is set, processor 40 may determine, as a result of operation 504, that the data phase of this configuration write operation has been completed. Conversely, if this status bit value is not set, this may indicate that the data phase of this configuration write operation has not been completed. Accordingly, if this status bit value is not set, processor 40 may determine, as a result of operation 504, that this configuration write operation has not been completed.

If, as a result of operation 504, processor 40 determines that the data phase of the host processor's PCI configuration write operation has not been completed, processor 40 may signal card 20. This may result in flushing (e.g., clearing) by card 20 of a write-back cache memory (not shown, which may be comprised in, e.g., memory 38) of one or more I/O transactions to be executed by controller 26. Prior to flushing these I/O transactions from the cache memory, card 20 may store in memory 38 information that may be used by processor 40 to reconstruct later these I/O transactions. Thereafter, card 20 may disable the write-back cache from recording new I/O transactions to be executed by controller 26.

Additionally, processor 40 also may provide one or signals to card 20 that may result in disabling of card 20 from requesting that controller 26 perform "internally generated I/O requests," and also may result in disabling of controller 26 from performing further I/O transactions, as illustrated by operation 506. As used herein, an "internally generated I/O request" is an I/O request that does not result from an earlier I/O request provided to card 20 from a device that is external to card 20, such as, for example, host processor 12.

More specifically, with regard to the disabling of controller 26 from performing further I/O transactions, processor 40 may determine (e.g., based upon information stored in memory 38 that may track I/O transactions assigned by processor 40 to be performed by controller 26 whether pending I/O transactions have been assigned by processor 40 to be performed by controller 26. As used herein, a "pending" I/O transaction is an I/O transaction of which a device assigned to perform, execute, and/or initiate the transaction has been informed, but whose performance, execution, and/or initiation has yet to be completed. Processor 40 may signal card 20 to permit any such pending I/O transactions to be performed by controller 26, and thereafter, to disable controller 26 from performing any further I/O transactions.

Conversely, if, as a result of operation 504, processor 40 determines that the data phase of the host processor's configuration write operation to memory locations 48 has been completed, processor 40 may determine whether host processor 12 has changed the first set of resources previously allocated to card 20, as illustrated by operation 516 in FIG. 5. The manner in which processor 40 may make this determination is described below.

After, or contemporaneous with operation 506, processor 40 may read and store in memory 38 the one or more values that are currently stored in memory locations 48, as illustrated by operation 508 in FIG. 5. Thereafter, processor 40 may set a control bit value in the memory locations 51 that may indicate that card 20 is to cease issuing retries to host processor 12 so as to permit the PCI configuration write operation initiated by host processor 12 to memory locations 48 to complete. In response to the setting of this control bit value, processor 40 may signal card 20. This may result in card 20 ceasing to issue the retries to host processor 12, and thereby permitting host processor 12 to complete its PCI configuration write operation to memory locations 48, as illustrated by operation 510 in FIG. 5.

After operation 510, processor 40 may determine whether the data phase of the PCI configuration write operation initiated by host processor 12 has been completed, as illustrated by operation 512 in FIG. 5. Processor 40 may make this determination by examining, in the manner described previously, a status bit value in the memory locations 51 to determine whether the data phase of this configuration write operation has been completed.

If, as a result of operation 512, processor 40 determines that this configuration write operation has not been completed, processor 40 may clear an ISR status flag bit value in memory locations 51 to indicate completion by processor 40 of the ISR, and may terminate the ISR, as illustrated by operation 514 in FIG. 5. Thereafter, if the configuration write operation continues, processor 40 may again detect the configuration write operation, and may generate an interrupt signal that may result in execution by processor 40 of a subsequent iteration of the ISR. During the time interval between the ceasing by card 20 of the issuing of retries to processor 12, as a result of operation 510, and the commencement of execution of this subsequent iteration of the ISR, the configuration write operation may complete.

Conversely, if, as a result of operation 512, processor 40 determines that the host processor's configuration write operation to memory locations 48 has been completed, processor 40 may determine whether the first set of resources previously allocated to card 20 has been changed by host processor 12, as illustrated by operation 516. Processor 40 may make this determination, based at least in part, upon a comparison of the one or more values that were previously stored in memory locations 48 prior to completion of this configuration write operation and the one or more values that are stored in memory locations 48 after completion of this configuration write operation. The one or more values that were previously stored in the memory locations 48 prior to completion of this configuration write operation may have been previously stored in memory 38 by processor 40 (e.g., as a result of execution of operation 508 in the present, or a previous iteration of the ISR).

In accordance with this embodiment, if, as a result of operation 516, processor 40 determines that the host processor 12 has changed the first set of resources previously allocated to card 20 by host processor 12, processor 40 may change the second set of resources that processor 40 previously allocated to controller 26, such that the second set resources allocated to controller 26 may be comprised in the first set of resources allocated to card 20, as changed by host processor 12. Processor 40 then may signal card 20 to perform one or more PCI configuration write operations to change the one or more values stored in memory locations 50 to reflect the change made to the second set of resources allocated to controller 26, thereby reconfiguring controller 26, as illustrated by operation 518 in FIG. 5.

For example, in operation 516, processor 40 may determine whether processor 12 has changed the memory mapped I/O address space 402 that processor 12 previously allocated to card 20. If processor 40 determines that processor 12 has changed the memory mapped I/O address space previously allocated to card 20, this may result in I/O processor 40 changing its previous allocation of memory mapped I/O addresses to I/O ports and/or memory locations in the controller 26. More specifically, this may result in I/O processor 40 dividing the changed memory mapped I/O address space presently allocated by host processor 12 to card 20 into two portions. If the changed memory mapped I/O address space presently allocated to card 20 by host processor 12 is equal in size to space 402, the two portions have sizes that may be equal to the sizes of spaces 404 and 406, respectively. Processor 40 may allocate to card 20 the portion that has the same size as space 404, and may allocate to controller 26 the portion that has the same size as space 406. This may ensure that the memory mapped I/O addresses allocated to I/O ports and/or memory locations 46 in controller 26 may be comprised within the changed memory mapped I/O address space allocated to card 20 by host processor 12.

After processor 40 either has determined, as a result of operation 516, that the first set of resources previously allocated to it has not changed, or alternatively, has determined that the first set of resources has changed and has performed operation 518, processor 40 may signal card 20. As a result, card 20 may enable the write-back cache memory comprised in memory 38. Also as a result of processor 40 signaling card 20, card 20 may be enabled to request controller 26 to perform internally generated I/O requests, and card 20 may signal, via bus 22, the controller 26 to enable controller 26 to perform I/O transactions, as illustrated by operation 520 in FIG. 5. Thereafter, processor 40 may clear an ISR status flag bit value in memory locations 51 to indicate completion by processor 40 of the ISR, and may terminate the ISR, as illustrated by operation 514 in FIG. 5.

System 100 has been described as comprising a single bus addressable device, such as, controller 26, that may be controlled and/or configured by card 20 using hardware 24. However, system 100 may include a plurality of bus addressable devices that may be controllable and/or configurable by card 20 using hardware 24.

Additionally, although not shown in the Figures, card 20 may include additional logic that may prevent assertion of the TMS signal by card 20 unless the PCI GNT# signal (not shown) of bus 22 for card 20 is also asserted. This may permit card 20 to locate and/or configure I/O controller 26 without performing operation 304.

Thus, in summary, one system embodiment comprises a circuit board including a host processor, a first device (e.g., an I/O controller), a second device (e.g., an MROMB circuit card), and a PCI bus. The second device may be capable of being coupled to the bus. When the second device is coupled to the bus, the second device also may be capable of detecting a configuration write operation initiated by the host processor that can result in a change of a first set of resources previously allocated to the second device. This first set of resources may include memory mapped I/O addresses. The second device may capable of changing, if the operation has completed at least a certain phase, and the first set of resources has changed as a result of the operation, a second set of resources previously allocated by the second device to the first device. The second set of resources may include memory mapped I/O addresses. Prior to changing the second set of resources previously allocated to the first device, the second device may be capable of disabling the first device from processing I/O transactions involving the first device. Advantageously, these features of this system embodiment may reduce the possibility that a conflict may arise between one or more resources, such as memory mapped I/O addresses, allocated by the host processor and one or more resources allocated by the circuitry in the card to the at least one bus addressable device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
   detecting an operation initiated by a first device that can result in a change of a first set of resources previously allocated to a second device; and
   if the operation has completed at least a certain phase of the operation and the first set of resources has changed as a result of the operation, changing, by the second device, a second set of resources previously allocated by the second device to a third device.

2. The method of claim 1, wherein:
   the first set of resources comprises an address space;
   the second set of resources comprises another address space.

3. The method of claim 1, further comprising:
   allocating, by the first device, the first set of resources to the second device.

4. The method of claim 1, wherein:
   the first set of resources, as initially allocated, comprises the second set of resources, as initially allocated.

5. The method of claim 1, wherein:
   the operation comprises a configuration write operation that includes a plurality of phases; and
   the certain phase comprises a data phase comprised in the plurality of phases.

6. The method of claim 1, further comprising:

initially preventing, by the second device, the operation from proceeding.

7. The method of claim 1, further comprising:

in response, at least in part to the detecting of the operation, disabling, by the second device, the second device and the third device from performing one or more input/output operations.

8. The method of claim 7, further comprising:

after changing the second set of resources, enabling the second device and the third device to perform the one or more input/output operations.

9. An apparatus comprising:

a first device to detect an operation initiated by a second device that can result in a change of a first set of resources previously allocated to the first device, and the first device being capable of changing, if the operation has completed at least a certain phase of the operation and the first set of resources has changed as a result of the operation, a second set of resources previously allocated by the first device to a third device.

10. The apparatus of claim 9, wherein:

the first set of resources comprises an address space;

the second set of resources comprises another address space.

11. The apparatus of claim 9, wherein:

the second device is capable of allocating the first set of resources to the first device.

12. The apparatus of claim 9, wherein:

the first set of resources, as initially allocated, comprises the second set of resources, as initially allocated.

13. The apparatus of claim 9, wherein:

the operation comprises a configuration write operation that includes a plurality of phases; and the certain phase comprises a data phase comprised in the plurality of phases.

14. The apparatus of claim 9, wherein:

the first device is also capable of preventing the operation from proceeding.

15. The apparatus of claim 9, wherein:

the first device is also capable of disabling, in response, at least in part to detection of the operation by the first device, the first device and the third device from performing one or more input/output operations.

16. The apparatus of claim 15, wherein:

the first device is further capable of enabling, after the first device has changed the second set of resources, the first device and the third device to perform the one or more input/output operations.

17. An article comprising:

a storage medium having stored thereon instructions that when executed by a machine result in the following:

detecting of an operation initiated by a first device that can result in a change of a first set of resources previously allocated to a second device; and     if the operation has completed at least a certain phase of the operation and the first set of resources has changed as a result of the operation, changing, by the second device, of a second set of resources previously allocated by the second device to a third device.

18. The article of claim 17, wherein:

the first set of resources comprises an address space;

the second set of resources comprises another address space.

19. The article of claim 17, wherein:

the instructions when executed by the machine also result in allocating, by the first device, of the first set of resources to the second device.

20. The article of claim 17, wherein:

the first set of resources, as initially allocated, comprises the second set of resources, as initially allocated.

21. The article of claim 17, wherein:

the operation comprises a configuration write operation that includes a plurality of phases; and the certain phase comprises a data phase comprised in the plurality of phases.

22. The article of claim 17, wherein:

the instructions when executed by the machine also result in initially preventing, by the second device, the operation from proceeding.

23. The article of claim 17, wherein:

the instructions when executed by the machine also result in disabling, by the second device, in response, at least in part to the detecting of the operation, of the second device and the third device from performing one or more input/output operations.

24. The article of claim 17, wherein:

the instructions when executed by the machine also result in enabling, after changing the second set of resources, of the second device and the third device to perform the one or more input/output operations.

25. A system comprising:

a circuit board including a processor, a first device, and a bus;

a second device that is capable of being coupled to the bus, and when the second device is coupled to the bus, the second device is also capable of detecting an operation initiated by the processor that can result in a change of a first set of resources previously allocated to the second device, the second device being capable of changing, if the operation has completed at least a certain phase of the operation and the first set of resources has changed as a result of the operation, a second set of resources previously allocated by the second device to the first device.

26. The system of claim 25, wherein:

the second device comprises a circuit card;

the processor comprises a host processor; and the first device comprises one of a data storage controller, a network data communication controller, and a server management controller.

27. The system of claim 25, wherein:

the circuit board also includes a modular redundant array of inexpensive disks (RAID) on motherboard (MROMB) mechanism.

28. The system of claim 25, wherein:

the circuit board also comprises an interrupt controller and a mechanism to selectively couple an interrupt signal line from the first device to the interrupt controller.

29. The system of claim 25, wherein:

the circuit board also comprises a mechanism to selectively couple an Initialization Device Select (IDSEL) signal line of the first device to the bus.

30. The system of claim 29, wherein:

the second device, when coupled to the bus, is capable of generating a control signal that results in the mechanism coupling the IDSEL signal line to the bus.

* * * * *